(12) United States Patent
Letts et al.

(10) Patent No.: US 12,337,581 B2
(45) Date of Patent: Jun. 24, 2025

(54) CONSTRUCTION BOARDS WITH FOIL-CONTAINING FACERS

(71) Applicant: Firestone Building Products Company, LLC, Nashville, TN (US)

(72) Inventors: John B. Letts, Carmel, IN (US); Jiansheng Tang, Westfield, IN (US); Michael J. Hubbard, Goshen, IN (US)

(73) Assignee: Holcim Technology Ltd, Zug (CH)

( * ) Notice: Subject to any disclaimer, the term of this patent is extended or adjusted under 35 U.S.C. 154(b) by 1017 days.

(21) Appl. No.: 17/422,442

(22) PCT Filed: Jan. 16, 2020

(86) PCT No.: PCT/US2020/013839
§ 371 (c)(1),
(2) Date: Jul. 12, 2021

(87) PCT Pub. No.: WO2020/150450
PCT Pub. Date: Jul. 23, 2020

(65) Prior Publication Data
US 2022/0088899 A1   Mar. 24, 2022

Related U.S. Application Data

(60) Provisional application No. 62/794,085, filed on Jan. 18, 2019.

(51) Int. Cl.
*B32B 5/18* (2006.01)
*B32B 5/02* (2006.01)
(Continued)

(52) U.S. Cl.
CPC ............... *B32B 5/18* (2013.01); *B32B 5/022* (2013.01); *B32B 7/12* (2013.01); *B32B 29/007* (2013.01);
(Continued)

(58) Field of Classification Search
CPC .. B32B 5/18; B32B 5/022; B32B 5/20; B32B 7/12; B32B 15/046; B32B 15/12;
(Continued)

(56) References Cited

U.S. PATENT DOCUMENTS

| 3,276,928 A | 10/1966 | Pearson et al. |
| 3,442,750 A | 5/1969 | Wilcox |

(Continued)

FOREIGN PATENT DOCUMENTS

| EP | 3281782 A1 | 2/2018 |
| WO | WO-2017164676 A1 * | 9/2017 |

OTHER PUBLICATIONS

International Search Report and Written Opinion for related PCT/US2020/013839 dated Mar. 16, 2020 (13 pp).

*Primary Examiner* — Camie S Thompson
(74) *Attorney, Agent, or Firm* — Renner, Kenner; Arthur M. Reginelli

(57) ABSTRACT

A construction board comprising a foam body said foam body having first and second planar sides. The construction board further comprising a multi-layered facer affixed to said first or second planar side of said foam body. The multi-layered facer including a first foil layer, a first paper layer, a glass fabric layer, a second paper layer, and a second foil layer.

8 Claims, 2 Drawing Sheets

(51) Int. Cl.
*B32B 7/12* (2006.01)
*B32B 29/00* (2006.01)
*B32B 29/02* (2006.01)
*E04B 1/80* (2006.01)
*E04C 2/292* (2006.01)
*E04D 3/18* (2006.01)

(52) U.S. Cl.
CPC ............... *B32B 29/02* (2013.01); *E04B 1/80* (2013.01); *E04C 2/292* (2013.01); *E04D 3/18* (2013.01); *B32B 2262/101* (2013.01); *B32B 2266/0278* (2013.01); *B32B 2419/00* (2013.01)

(58) Field of Classification Search
CPC ....... B32B 15/14; B32B 15/20; B32B 29/007; B32B 29/02; B32B 2260/21; B32B 2260/04; B32B 2262/101; B32B 2266/0214; B32B 2419/06; B32B 2419/00; E04D 3/18; E04D 3/06; E04D 3/16; E04D 3/04

USPC ................... 428/311.1, 411.1; 442/370, 373; 162/145, 160

See application file for complete search history.

(56) References Cited

U.S. PATENT DOCUMENTS

| | | |
|---|---|---|
| 3,903,346 A | 9/1975 | Deleon |
| 4,073,998 A | 2/1978 | O'Connor |
| 4,459,334 A | 7/1984 | Blanpied et al. |
| 4,777,086 A | 10/1988 | Madden et al. |
| 5,057,169 A | 10/1991 | Adelman |
| 2010/0003487 A1 | 1/2010 | Crostic, Jr. |
| 2015/0204065 A1 | 7/2015 | Lotti et al. |

\* cited by examiner

CONSTRUCTION BOARDS WITH FOIL-CONTAINING FACERS

This application is a National-Stage application of PCT/US2020/013839 filed on Jan. 16, 2020, which claims the benefit of U.S. Provisional Application Ser. 62/794,085 filed on Jan. 18, 2019, which are incorporated herein by reference.

FIELD OF THE INVENTION

Embodiments of the present invention relate to construction boards with multi-layered foil-containing facers.

BACKGROUND OF THE INVENTION

Construction boards, particularly those employed in the construction industry, may include a foam layer and at least one facer. Often, the foam layer is sandwiched between two facers. The foam layer can include a closed cell polyurethane or polyisocyanurate foam.

The composition of the facers can impact the ultimate performance of the construction boards. This is particularly true where the construction boards include roofing insulation boards, cover boards, or roofing recovery boards that must meet various performance specifications to be utilized on a roof.

Throughout time, numerous different materials have been utilized to create facers. For example, construction boards have been fabricated by using cellulosic facers (e.g. kraft paper), metal foil or metallized fabrics, and non-woven fiberglass facers. Where foil has been used, the foil is often included within a composite that includes various other materials such as kraft paper and fabric scrim. These various components of composite facers, which may also be referred to as layers of a multi-layered composite, are often adhered to each other to form the composite facers.

While the prior art contemplates several foil-containing composites for use as facer materials, the prior art materials lead to imperfections is the foil, especially the aesthetic features of the foil layer.

SUMMARY OF THE INVENTION

One or more embodiments of the present invention provide a construction board comprising a foam body, said foam body having first and second planar sides; and a multi-layered facer affixed to said first or second planar surface of said foam body, said multi-layered facer including a first foil layer, a first paper layer, a glass fabric layer, a second paper layer and a second foil layer.

Yet other embodiments of the present invention provide a construction board comprising a foam body, said foam body having first and second planar sides; and a multi-layered facer affixed to said first or second planar surface, said multi-layered facer including a first foil layer, a glass fabric layer, and a second foil layer.

Other embodiments of the present invention provide a construction board comprising a foam body, said foam body having first and second planar sides; and a multi-layered facer affixed to said first or second planar surface, said multi-layered facer including a first foil layer, a first glass fabric layer, a paper layer, a second glass fabric layer, and a second foil layer.

Still other embodiments of the present invention provide a construction board comprising a foam body, said foam body having first and second planar sides; and a multi-layered facer affixed to said first or second planar surface, said multi-layered facer including a first foil layer, a reinforced paper layer, and a second foil layer.

DETAILED DESCRIPTION OF ILLUSTRATIVE EMBODIMENTS

Figure 1:
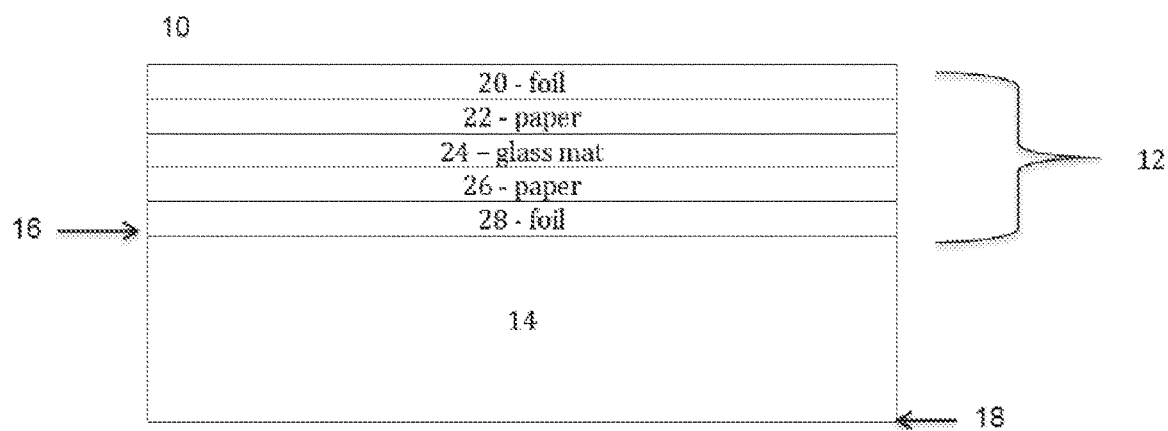
FIG. 1 is a fragmentary side profile view of a construction board of one or more embodiments of the present invention employing a multi-layered facer.

Embodiments of the invention are based, at least in part, on the discovery of multi-layered, foil-containing composites that are useful as facers in the manufacture of foam construction boards, particularly polyisocyanurate foam insulation or construction boards. While the prior art contemplates several foil-containing composites for use as facer materials, aspects of the invention are based on the discovery that certain polyisocyanurate foams undergo dimensional variations during the manufacturing process. The dimensional variations of prior art composites lead to imperfections in the foil, especially to the aesthetic features of the foil layer. It is believed that that composite facers of the present invention overcome the difficulties of the prior art by providing particular composite constructions that offer greater dimensional stability and therefore greater resistance to dimensional changes in the foam.

First Embodiment

Construction boards of a first embodiment of the present invention may be described with reference to FIG. 1, which shows construction board 10. Construction board 10 includes a multi-layered facer 12, which may be referred to as composite 12, and a foam layer 14. Facer 12 is secured to foam layer 14 at first planar side 16 of foam layer 14. Construction board 10 may also include an optional second multi-layered facer positioned opposite facer 12 on a second planar side 18 of foam layer 14. In one or more embodiments, multi-layered facer 12 is continuous over the entirety of the first planar side 16 of the foam layer 14.

As further shown in FIG. 1, multi-layered facer 12 includes five layers. Namely, facer 12 includes a first foil layer 20, which may be referred to as the upper foil layer 20, and which is the upper-most layer (i.e. is the layer furthest from foam layer 14). Disposed adjacent to and below first foil layer 20 is a first paper layer 22, which may be referred to as upper paper layer 22. Disposed below and adjacent to first paper layer 22 is a glass fabric layer 24, which may be referred to as a fiberglass mat layer 24 or a glass mat layer 24. Disposed adjacent to and below glass fabric layer 24 is second paper layer 26, which may be referred to as lower paper layer 26. Disposed below and adjacent to second paper layer 26 is second foil layer 28, which may be referred to as lower foil layer 28. Lower foil layer 28 is positioned directly adjacent to foam layer 14 on the first planar side 16.

In one or more embodiments, each of the layers of multi-layered facer 12 may be adhered to its adjacent layer. For example, first foil layer 20 is adhered to first paper layer 22, first paper layer 22 is adhered to glass fabric layer 24, glass fabric layer 24 is adhered to second paper layer 26, and second paper layer 26 is adhered to second foil layer 28. The various layers of multi-layered facer 12 can be adhered by employing conventional means including the use of hot-melt thermoplastic adhesives. Foam layer 14 is adhered to bottom foil 28 by mating a developing foam (which gives rise to foam layer 14) to bottom foil 28 during manufacture of the foam.

Second Embodiment

Construction boards of a second embodiment of the present invention may be described with reference to FIG. 2, which shows a construction board 100. Construction board 100 includes a multi-layered facer 102 and a foam layer 104. Facer 102 is secured to foam layer 104 at first planar side 106 of foam layer 104. Construction board 100 may also include an optional second multi-layered facer positioned opposite facer 102 on a second planar side 108 of foam layer 104. In one or more embodiments, multi-layered facer 102 is continuous over the entirety of the first planar side 106 of the foam layer 104.

Figure 2:
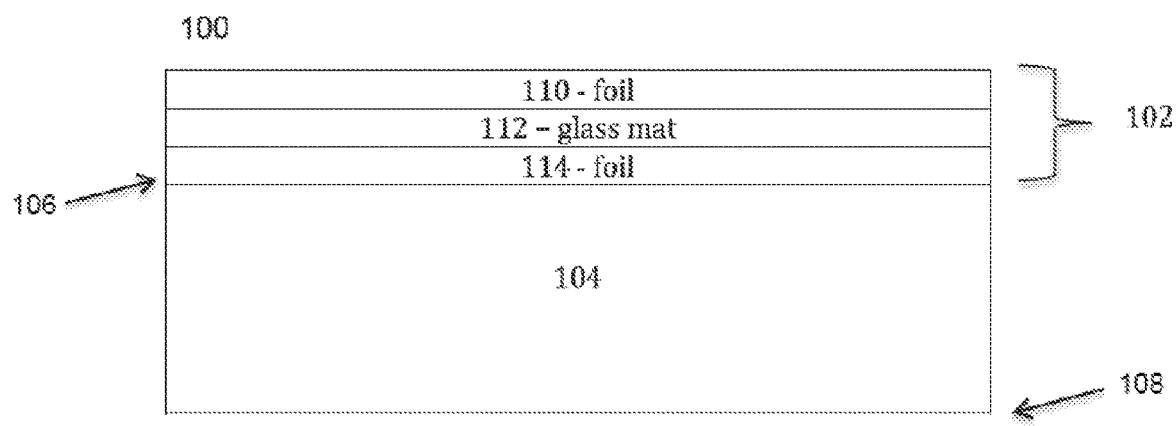
FIG. 2 is a fragmentary side profile view of a construction board of one or more embodiments of the present invention employing a multi-layered facer.

As further shown in FIG. 2, multi-layered facer 102 includes three layers. Namely, multi-layered facer 102 includes a first foil layer 110, which may be referred to as upper foil layer 110 and which is the upper-most layer (i.e. is the layer furthest from foam layer 104). Disposed adjacent to and below first foil layer 110 is a glass fabric layer 112, which may be referred to as a fiberglass mat layer 112 or a glass mat layer 112. Disposed adjacent to and below glass fabric layer 112 is a second foil layer 114, which may be referred to as lower foil layer 114. Lower foil layer 114 is positioned directly adjacent to foam layer 104 on the first planar side 106.

In one or more embodiments, each of the layers of multi-layered facer 102 may be adhered to its adjacent layer. For example, first foil layer 110 is adhered to glass fiber layer 112, and glass fiber layer 112 is adhered to second foil layer 114. The various layers of multi-layered facer 102 can be adhered by employing conventional means including the use of hot-melt thermoplastic adhesives. Foam layer 104 is adhered to bottom foil 114 by mating a developing foam to bottom foil 114 during manufacture of the foam.

Third Embodiment

Construction boards of a third embodiment of the present invention may be described with reference to FIG. 3, which shows 200. Construction board 200 includes a multi-layered facer 202 and a foam layer 204. Facer 202 is secured to foam layer 204 at first planar side 206 of foam layer 204. Construction board 200 may also include a second multi-layered facer positioned opposite facer 202 on a second planar side 208 of foam layer 204. In one or more embodiments, multi-layered facer 202 is continuous over the entirety of the first planar side 206 of the foam layer 204.

Figure 3:
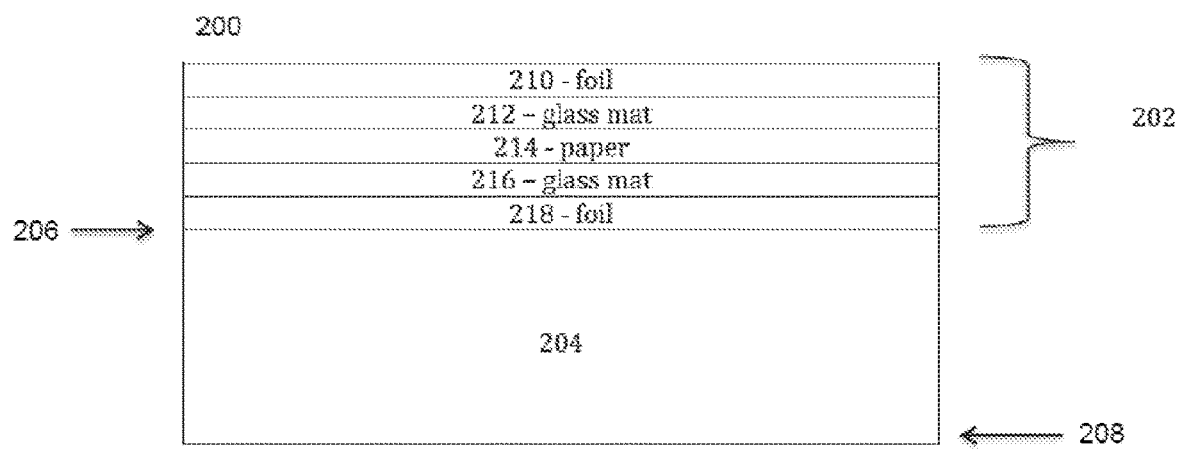
FIG. 3 is a fragmentary side profile view of a construction board of one or more embodiments of the present invention employing a multi-layered facer.

As further shown in FIG. 3, multi-layered facer 202 has five layers. Namely, facer 202 includes a first foil layer 210, which may be referred to as upper foil layer 210 and which is the upper-most layer (i.e. is the layer furthest from foam layer 204). Disposed adjacent to and below first foil layer 210 is first glass fabric layer 212, which may be referred to as upper glass fabric layer 212, as first or upper fiberglass mat layer 212, or as first or upper glass mat layer 212. Disposed below and adjacent to first glass fabric layer 212 is paper layer 214. Disposed below and adjacent to paper layer 214 is a second glass fabric layer 216, which may be referred to as lower glass fabric layer 216, as second or lower fiberglass mat layer 216, or as second or lower glass mat layer 216. Disposed below and adjacent to lower glass fabric layer 216 is a second foil layer 218, which may be referred to as lower foil layer 218. Lower foil layer 218 is positioned directly adjacent to foam layer 204 on the first planar side 206.

In one or more embodiments, each of the layers of multi-layered facer 202 may be adhered to its adjacent layer. For example, first foil layer 210 is adhered to first glass fabric layer 212, first glass fabric layer 212 is adhered to paper layer 214, paper layer 214 is adhered to second glass fabric layer 216, and second glass fabric layer 216 is adhered to second foil layer 218. The various layers of multi-layered facer 202 can be adhered by employing conventional means including the use of hot-melt thermoplastic adhesives. Foam layer 204 is adhered to bottom foil 218 during manufacture of the foam.

Fourth Embodiments

Construction boards of a fourth embodiment of the present invention may be described with reference to FIG. 4, which shows a construction board 300. Construction board 300 includes a multi-layered facer 302 and a foam layer 304. Facer 302 is secured to foam layer 304 at first planar side 306 of foam layer 304. Construction board 300 may also include an optional second multi-layered facer positioned opposite facer 302 on a second planar side 308 of foam layer 304. In one or more embodiments, multi-layered facer 302 is continuous over the entirety of the first planar side 306 of the foam layer 304.

Figure 4:
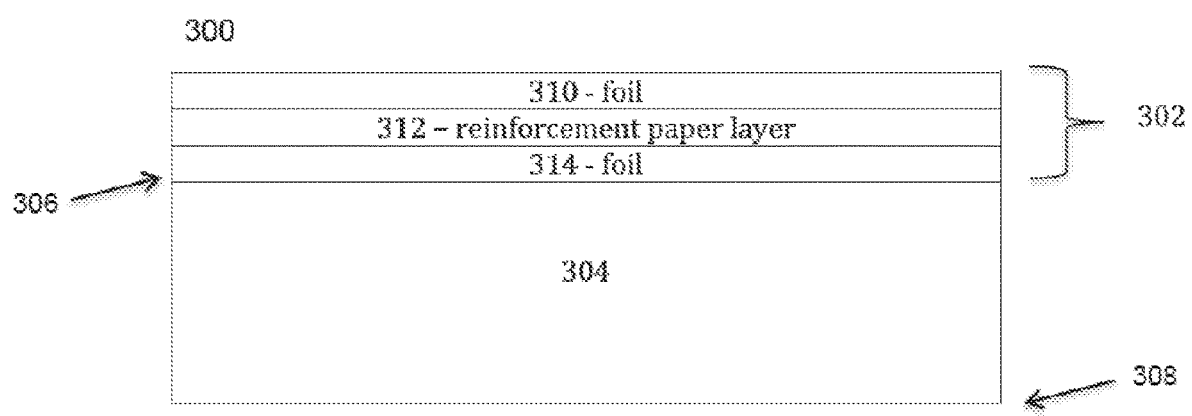
FIG. 4 is a fragmentary side profile view of a construction board of one or more embodiments of the present invention employing a multi-layered facer.

As further shown in FIG. 4, multi-layered facer 302 includes three layers. Namely, multi-layered facer 302 includes a first foil layer 310, which may be referred to as upper foil layer 310 and which is the upper-most layer (i.e. is the layer furthest from foam layer 304). Disposed adjacent to and below first foil layer 310 is a reinforced-paper layer 312. Disposed adjacent to and below reinforced-paper layer 312 is a second foil layer 314, which may be referred to as lower foil layer 314. Lower foil layer 314 is positioned directly adjacent to foam layer 304 on the first planar side 306.

In one or more embodiments, each of the layers of composite 300 may be adhered to its adjacent layer. For example, first foil layer 310 is adhered to reinforced paper layer 312, and reinforced-paper layer 312 is adhered to second foil layer 314. The various layers of composite 302 can be adhered by employing conventional means including the use of hot-melt thermoplastic adhesives. Foam layer 304 is adhered to bottom foil 314 by mating a developing foam to bottom foil 314 during manufacture of the foam.

The following components may be used in the foregoing embodiments.

Foam Layer

The developing foam that gives rise to foam layer may be produced by employing conventional techniques for forming polyurethane and/or polyisocyanurate foams. Conventional procedures may include contacting an A-side stream of reagents with a B-side stream of reagents to form a mixture, and then depositing the mixture or developing foam onto a laminator carrying a multi-layered facer. Typically, the A-side stream may include an isocyanate compound and the B-side may include an isocyanate-reactive compound.

In one or more embodiments, the A-side stream may only contain the isocyanate. In other embodiments, the A-side stream may also contain flame-retardants, surfactants, blowing agents and other non-isocyanate-reactive components.

Suitable isocyanates are generally known in the art. Useful isocyanates include aromatic polyisocyanates such as diphenyl methane, diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4' diisocyanatobenzene. Exemplary isocyanate components include polymeric Rubinate 1850 (Huntsmen Polyurethanes), polymeric Lupranate M70R (BASF), and polymeric Mondur 489N (Bayer).

The B-side stream, which contains isocyanate reactive compounds, may also include flame retardants, catalysts, emulsifiers/solubilizers, surfactants, blowing agents, fillers, fungicides, anti-static substances, water and other ingredients that are conventional in the art.

An exemplary isocyanate-reactive component is a polyol. The terms polyol or polyol component include diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one embodiment a polyester polyol is employed. In one or more embodiments, the present invention may be practiced in the appreciable absence of any polyether polyol. In certain embodiments, the ingredients are devoid of polyether polyols.

Catalysts are believed to initiate the polymerization reaction between the isocyanate and the polyol, as well as a trimerization reaction between free isocyanate groups when polyisocyanurate foam is desired. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris [(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components.

Surfactants may serve two purposes. First, they may help to emulsify/solubilize all the components so that they react completely. Second, they may promote cell nucleation and cell stabilization. Exemplary surfactants include silicone co-polymers or organic polymers bonded to a silicone polymer. Although surfactants can serve both functions, a more cost effective method to ensure emulsification/solubilization may be to use enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant B8522, and GE 6912. U.S. Pat. Nos. 5,686,499 and 5,837,742 are incorporated herein by reference to show various useful surfactants.

Suitable emulsifiers/solubilizers include DABCO Ketene 20AS (Air Products), and Tergitol NP-9 (nonylphenol+9 moles ethylene oxide).

Flame Retardants may be used in the production of polyurethane and polyisocyanurate foams, especially when the foams contain flammable blowing agents such as pentane isomers. Useful flame retardants include tri(monochloropropyl) phosphate (a.k.a. tris(cloro-propyl) phosphate), tri-2-chloroethyl phosphate (a.k.a. tris(chloro-ethyl) phosphate), phosphonic acid, methyl ester, dimethyl ester, and diethyl ester. U.S. Pat. No. 5,182,309 is incorporated herein by reference to show useful blowing agents. Useful blowing agents include isopentane, n-pentane, cyclopentane, alkanes, (cyclo) alkanes, hydrofluorocarbons, hydrochlorofluorocarbons, fluorocarbons, fluorinated ethers, alkenes, alkynes, carbon dioxide, and noble gases.

In one or more embodiments, foam layer includes a rigid closed-cell foam structure. In one or more embodiments, foam layer may include a polyurethane, polyurea, phenolic, or polyisocyanurate foam.

In one or more embodiments, foam layer may be characterized by a foam density (ASTM C303) that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In one or more embodiments, the foam layer of insulation boards is characterized by having a density that is greater than 1.50 pounds per cubic foot (7.32 kg/m$^2$), or in other embodiments, greater than 1.55 pounds per cubic foot (7.57 kg/m$^2$).

Where the density of foam layer is less than 2.5 pounds per cubic foot, it may be advantageous for foam layer to be characterized by having an index of at least 120, in other embodiments at least 150, in other embodiments at least 175, in other embodiments at least 200, and in other embodiments at least 225, as determined by PIR/PUR ratio as determined by IR spectroscopy using standard foams of known index (note that ratio of 3 PIR/PUR provides an ISO Index of 300). Foam construction boards having a foam layer of similar nature are described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which are incorporated herein by reference.

In other embodiments, foam layer may be characterized by density that is greater than 2.5 pounds per cubic foot (12.2 kg/m$^2$), as determined according to ASTM C303, in other embodiments the density is greater than 2.8 pounds per cubic foot (13.7 kg/m$^2$), in other embodiments greater than 3.0 pounds per cubic foot (14.6 kg/m$^2$), and still in other embodiments greater than 3.5 pounds per cubic foot (17.1 kg/m²). In one or more embodiments, the density of foam layer of the recovery boards may be less than 20 pounds per cubic foot (97.6 kg/m²), in other embodiments less than 10 pounds per cubic foot (48.8 kg/m²), in other embodiments less than 6 pounds per cubic foot (29.3 kg/m²), in other embodiments less than 5.9 pounds per cubic foot (28.8 kg/m²), in other embodiments less than 5.8 pounds per cubic foot (28.3 kg/m²), in other embodiments less than 5.7 pounds per cubic foot (27.8 kg/m²), in other embodiments less than 5.6 pounds per cubic foot (27.3 kg/m²), and still in other embodiments less than 5.5 pounds per cubic foot (26.9 kg/m²). Foam construction boards having a foam layer of similar nature are described in U.S. application Ser. Nos. 11/343,466 and 12/525,159, which are incorporated herein by reference.

Where the density of foam layer is greater than 2.5 pounds per cubic foot, it may be advantageous for foam layer to be characterized by an ISO Index, as determined by PIR/PUR ratio as determined by IR spectroscopy using standard foams of known index (note that ratio of 3 PIR/PUR provides an ISO Index of 300) of at least 180, in other embodiments at least 200, in other embodiments at least 220, in other embodiments at least 270, in other embodiments at least 285, in other embodiments at least 300, in other embodiments at least 315, and in other embodiments at least 325. In these or other embodiments, the ISO Index may be less than 360, in other embodiments less than 350, in other embodiments less than 340, and in other embodiments less than 335.

Foil Layer

In one or more embodiments, both the first foil layer and second foil layer of each construction board of the present invention are a foil or metallized polymeric film sheet. For example, the foil layers may be an aluminum foil sheet. In one or more embodiments, the foil layers are air impermeable to the extent that they preclude the flow of air or appreciable levels thereof.

Paper Layer

In one or more embodiments, the paper layer(s) of construction boards of the present invention include a cellulosic non-woven fabric or substrate. For example, the paper layer(s) may include cellulose fibers, which may also be referred to as pulp. These fibers may derive from wood, fiber crops, or waste paper. Wood fibers, also referred to as pulpwood, may derive from softwood trees such as spruce, pine, fir, larch, and hemlock, or from hardwoods such as eucalyptus, aspen and birch. As is known in the art, mechanical, chemical, thermo-mechanical, or recycle pulping processes can be used to obtain pulp. In particular embodiments, the pulp is obtained from kraft processing. In these or other embodiments, the pulp is de-inkend or recycled pulp. In particular embodiments, the pulp may be bleached. In other embodiments, the pulp is un-bleached. In one or more embodiments, the paper layer(s) are devoid or substantially devoid of glass reinforcement such as chopped glass reinforcement.

Glass Fabric Layer

In one or more embodiments, the glass fabric layer(s) of construction boards of the present invention includes a non-woven fiberglass mat. As is known in the art, these non-woven glass fabrics may be bonded using a variety of binders including those based upon formaldehyde. In particular embodiments, the fiberglass fabric is a non-woven fiberglass mat characterized by a weight of from about 0.05 to about 0.15 kg/m², or in other embodiments from about 0.08 to about 0.12 kg/m².

Reinforced Paper Layer

In one or more embodiments, the reinforced-paper layer of construction board of the present invention includes a pulp or cellulosic non-woven fabric or paper matrix with chopped fiberglass distributed throughout the reinforced paper layer. In one or more embodiments, the reinforced paper layer includes greater than 5 wt. %, in other embodiments greater than 10 wt. %, and in yet other embodiments greater than 15 wt. % fiberglass. In these or other embodiments, the reinforced paper layer includes less than 35 wt. %, in other embodiments less than 30 wt. %, and in yet other embodiments less than 25 wt. % fiberglass. In one or more embodiments, the reinforced paper layer includes from about 5 wt. % to about 35 wt. %, in other embodiments from about 10 wt. % to about 30 wt. %, and in other embodiments from about 15 wt. % to about 25 wt. % fiberglass.

INDUSTRIAL APPLICABILITY

In one or more embodiments, the construction boards of embodiments of this invention may be employed in roofing or wall applications. In particular embodiments, the construction boards are used in flat or low-slope roofing system. This may include use as insulation boards, cover boards, and recovery boards.

In one or more embodiments, a roofing system may include a roof deck having an insulation board, which may be fabricated according to practice of this invention, disposed thereon. An optional high density cover board which may also be prepared according to practice of this invention, may be positioned above the insulation board relative to the roof deck. A water-protective layer or membrane is disposed on top or above the high density board. In alternate embodiments, the high density board may be positioned below the insulation board.

Practice of this invention is not limited by the selection of any particular roof deck. Accordingly, the roofing systems of this invention can include a variety of roof decks. Exemplary roof decks include concrete pads, steel decks, wood beams, and foamed concrete decks.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700, 538, 5,703,154, 5,804,661, 5,854,327, 5,093,206, and 5,468, 550, which are incorporated herein by reference. Other useful polymeric membranes include those made from various thermoplastic polymers or polymer composites. For example, thermoplastic olefin (i.e. TPO), thermoplastic vulcanizate (i.e. TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Still in other embodiments, the protective membrane can include bituminous or asphalt membranes. In one embodiment, these asphalt membranes derive from asphalt sheeting that is applied to the roof. These asphalt roofing membranes are known in the art as described in U.S. Pat. Nos. 6,579,921, 6,110,846, and 6,764,733, which are incorporated herein by reference. In other embodiments, the protective membrane can derive from the application of hot asphalt to the roof.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The construction boards of this invention can be secured to a building structure by using various known techniques. For example, in one or more embodiments, the construction boards can be mechanically fastened to the building structure (e.g., the roof deck). In other embodiments, the construction boards can be adhesively secured to the building structure.

Various modifications and alterations that do not depart from the scope and spirit of this invention will become apparent to those skilled in the art. This invention is not to be duly limited to the illustrative embodiments set forth herein.

What is claimed is:

1. A construction board comprising:
   (a) a foam body, said foam body having first and second planar sides; and
   (b) a multi-layered facer affixed to said first or second planar side of said foam body, said multi-layered facer including a first foil layer, a first paper layer, a glass fabric layer, a second paper layer and a second foil layer.

2. The construction board of claim 1, wherein the second foil layer is adjacent the first or second planar side of the foam body.

3. The construction board of claim 1, wherein the glass fabric layer is sandwiched between the first paper layer and the second paper layer.

4. The construction board of claim 1, wherein the foam body is selected from the group consisting of polyisocyanurate, polyurethane materials, and mixtures thereof.

5. A construction board comprising:
   (a) a foam body, said foam body having first and second planar sides; and
   (b) a multi-layered facer affixed to said first or second planar side, said multi-layered facer including a first foil layer, a first glass fabric layer, a paper layer, a second glass fabric layer, and a second foil layer.

6. The construction board of claim 5, wherein the second foil layer is adjacent the first or second planar side of the foam body.

7. The construction board of claim 5, wherein the paper layer is sandwiched between the first glass fabric layer and the second glass fabric layer.

8. The construction board of claim 5, wherein the foam body is selected from the group consisting of polyisocyanurate, polyurethane materials, and mixtures thereof.

* * * * *